United States Patent [19]

Wilkinson et al.

[11] Patent Number: 5,436,210
[45] Date of Patent: Jul. 25, 1995

[54] METHOD AND APPARATUS FOR INJECTION OF A LIQUID WASTE INTO A MOLTEN BATH

[75] Inventors: Mark A. Wilkinson, Lexington; Rick M. Rauenzahn, Carlisle; Christopher J. Nagel, Wayland, all of Mass.

[73] Assignee: Molten Metal Technology, Inc., Waltham, Mass.

[21] Appl. No.: 13,756

[22] Filed: Feb. 4, 1993

[51] Int. Cl.⁶ .............................. A62D 3/00
[52] U.S. Cl. ..................... 588/201; 266/222; 266/268; 423/DIG. 12; 588/900; 75/528
[58] Field of Search ............ 588/201, 209, 900; 266/267, 268, 221, 222; 423/DIG. 12

[56] References Cited

U.S. PATENT DOCUMENTS

| | | | |
|---|---|---|---|
| 370,251 | 9/1887 | Field | 266/267 |
| 2,854,229 | 9/1958 | Earle | 266/267 |
| 3,186,476 | 6/1965 | Costenbader | 266/188 |
| 3,236,281 | 2/1966 | Bain | 266/267 |
| 3,582,053 | 6/1971 | Limbach | 266/188 |
| 3,608,881 | 9/1971 | Yordanov et al. | 266/41 |
| 3,771,473 | 11/1973 | Borgnat et al. | 110/182.5 |
| 3,997,334 | 12/1976 | Dlubek | 266/268 |
| 4,191,154 | 3/1993 | Nagel | 588/201 |
| 4,574,714 | 3/1986 | Bach et al. | 266/222 |
| 4,602,574 | 7/1986 | Bach et al. | 588/201 |
| 4,647,019 | 3/1987 | Masterson et al. | 266/243 |
| 4,657,586 | 4/1987 | Masterson et al. | 75/76 |
| 4,708,738 | 11/1987 | Masterson et al. | 75/59.1 |
| 4,754,951 | 7/1988 | Masterson et al. | 266/218 |
| 5,177,304 | 1/1993 | Nagel | 588/201 |
| 5,202,100 | 4/1993 | Nagel et al. | 423/5 |

FOREIGN PATENT DOCUMENTS

| | | | |
|---|---|---|---|
| 666171 | 7/1963 | Canada | 266/188 |
| 42-1352 | 1/1967 | Japan | 266/267 |
| 1205098 | 9/1970 | United Kingdom | 266/267 |
| 1343901 | 1/1974 | United Kingdom | 266/267 |

*Primary Examiner*—Gary P. Straub
*Attorney, Agent, or Firm*—Hamilton, Brook, Smith & Reynolds

[57] ABSTRACT

A method and apparatus are disclosed for injecting liquids into a molten bath. The method includes forming a suitable liquid dispersion of a liquid phase disposed in a gas phase. The liquid phase has a ratio of surface area to volume which is sufficient to cause an accumulated amount of the liquid phase in the molten bath to be significantly less than that which would occur by injection of a continuous stream of the liquid into the molten bath. The liquid dispersion is directed into the molten metal bath, whereby the liquid volatilizes or decomposes. The rate at which the liquid dispersion is injected into the molten bath is sufficient to cause the liquid of the liquid phase to volatilize or decompose at a rate which is sufficient to cause the accumulation of the liquid phase in the bath to be significantly less than that which would occur by injection of a continuous stream of the liquid into the molten bath. The apparatus includes an atomizer which is disposed at a reactor containing the molten bath. The atomizer can be, for example, a tuyere which atomizes a suitable liquid to form a liquid dispersion of the liquid in a gas. The liquid dispersion is directed into the molten bath through the tuyere for volatilization or decomposition of the liquid.

13 Claims, 5 Drawing Sheets

METHOD AND APPARATUS FOR INJECTION OF A LIQUID WASTE INTO A MOLTEN BATH

BACKGROUND OF THE INVENTION

The availability of methods for treatment of hazardous wastes is limited. Conventional methods for disposal of hazardous wastes, such as incineration, can also contaminate the environment. For example, incomplete combustion of hazardous wastes typically causes release of pollutants to the atmosphere in the form of gases and dust. Liquid hazardous wastes, in particular, are difficult to dispose of by conventional methods because the amount of suitable space which is available for burial of such wastes is rapidly diminishing. Further, liquid wastes often leak from disposal sites, generally diminishing the quality of life in surrounding populations.

One alternative attempt to treat hazardous wastes includes their destruction in a reactor containing a molten bath. Typically, the wastes are directed into the reactor onto the top of the molten bath therein. However, some waste components, such as liquid components, often volatilize and are discharged from the reactor before they can be decomposed in the presence of the molten bath.

Other known methods for combining hazardous waste with molten bath include, for example, submerged injection of the waste through tuyeres. However, submerged injection generally can not be extended to liquid wastes because most such liquids have a nucleation temperature which is substantially lower than that of the molten metal bath into which they are injected. Direct contact between liquid wastes and molten baths into which they are injected typically causes instantaneous volatilization of the liquid and consequent violent, or explosive, destruction of the molten bath, thereby causing a safety hazard for those operating such reactor systems.

Therefore, a need exists for a method and apparatus for submerged injection of liquids into molten baths which overcome or minimize the above-mentioned problems.

SUMMARY OF THE INVENTION

The present invention relates to a method and an apparatus for injecting a liquid into a molten bath.

The method includes atomizing a liquid in the presence of a gas to form a liquid dispersion having a liquid phase dispersed in a gas phase. The liquid phase has a ratio of surface area to volume which is sufficient to cause an accumulated amount of the liquid phase in the molten bath to be less than that which would occur by injection of a continuous stream of the liquid into the molten bath. The liquid dispersion is directed into the molten bath, having a temperature which is significantly greater than the nucleation temperature of the liquid component at the operating conditions of the molten bath, at a rate which is sufficient to cause liquid of the liquid phase to volatilize or decompose at a rate which is sufficient to cause the accumulation of the liquid phase in the bath to be less than that which would occur by injection of a continuous stream of the liquid into the molten bath.

The apparatus includes a tuyere having a liquid conduit and a gas conduit. The liquid conduit is suitable for conducting a liquid from a liquid source to the molten bath at a point below an upper surface of the molten bath. The gas conduit is in fluid communication with the liquid conduit. The gas conduit is also suitable for discharging a gas at sufficient velocity to substantially atomize liquid discharged from the liquid conduit and form a liquid dispersion which is directed into the molten bath. The liquid dispersion has a liquid phase dispersed in a gas phase. The liquid phase has a ratio of surface area to volume which is sufficient to cause an accumulated amount of the liquid phase in the molten bath under the operating conditions of the bath to be less than that which would occur by injection of a continuous stream of the liquid into the molten bath.

In another embodiment, the apparatus includes a liquid conduit having a liquid-discharge end. A gas conduit has a gas-discharge end. The liquid-discharge end is recessed within the gas conduit at a distance from the gas-discharge end which is sufficient to enable an atomizing gas, which is directed through the gas conduit, to atomize liquid discharged from the liquid conduit and form a liquid dispersion before the liquid contacts a molten bath into which the gas and the liquid are injected. The liquid dispersion has a liquid phase dispersed in a gas phase, wherein the liquid phase has a ratio of surface area to volume which is sufficient to cause an accumulated amount of the liquid phase in the molten bath, under the operating conditions of the bath, to be less than that which would occur by injection of a continuous stream of the liquid into the molten bath.

This invention has many advantages. For example, liquids, such as liquid hazardous wastes which have a nucleation temperature that is below that of a temperature of a molten metal bath, can be injected into the molten bath without a substantial risk of explosion. Further, the gas component of the liquid dispersion in the molten bath can include a reactive component which reacts with a component of the molten bath and/or with a component of the liquid component of liquid dispersion. The gas phase of the liquid dispersion can also include a component which reacts with the liquid component following volatilization of the liquid component in the molten bath.

Also, the reaction conditions of the molten bath can be controlled by the components of the liquid dispersion and/or the rate at which the liquid dispersion is directed into the molten bath. The composition of gaseous products generated by reaction within the molten bath can also be controlled by the composition and relative rates of introduction of the gaseous and liquid components of the liquid dispersion.

In addition, distribution of reactive components of the liquid within the molten bath can be controlled by the rate at which the liquid dispersion is injected into the molten bath and by controlling the relative amounts of liquid and gas components in the liquid dispersion. Further, the location, or locations, at which the liquid and gas components of the liquid dispersion are injected into the molten bath can be arranged to increase the yield of reactions in the molten bath, thereby diminishing the amount of unreacted and partially decomposed components of the liquid waste directed into the molten bath.

DETAILED DESCRIPTION OF THE INVENTION

The features and other details of the method of the invention will now be more particularly described with reference to the accompanying figures and pointed out in the claims. The same number present in different figures represents the same item. It will be understood that particular embodiments of the invention are shown by way of illustration and not as limitations of the invention. The principle features of this invention can be employed in various embodiments without departing from the scope of the invention.

The present invention generally relates to a method and system for injecting a liquid into a molten bath. Bach et al., U.S. Pat. Nos. 4,754,714 and 4,602,574, disclose a molten metal bath, such as is used in a steelmaking facility, which destroys polychlorinated biphenyls and other organic wastes, optionally together with inorganic wastes. Nagel, U.S. Pat. No. 5,177,304, issued Jan. 5, 1993, discloses a method and system for forming carbon dioxide from carbon-containing materials in a molten metal bath of immiscible metals. Nagel, U.S. Patent Application Ser. No. 07/737,048, filed Jul. 29, 1991, discloses a method and system for controlling chemical reaction in a molten metal bath. Nagel et al., U.S. Patent Application Ser. No. 07/737,199, filed Jul. 29, 1991, discloses a method and system of formation of oxides of dissolved atomic constituents in a molten metal bath. Nagel et al., U.S. Patent Application Ser. No. 07/788,804, filed Nov. 7, 1991, discloses a method and system for reducing the volume of radioactive compositions. Nagel et al., U.S. Patent Application Ser. No. 07/895,358, filed Jun. 8, 1992, and Nagel et al., U.S. Patent Application Ser. No. 07/895,346, filed Jun. 8, 1992, both disclose methods and apparatus for forming enriched hydrogen and carbon oxide gas streams from organic material in molten baths. The teachings of U.S. Pat. Nos. 4,754,714 and 4,602,574, and of U.S. Patent Applications Ser. Nos. 07/557,561, 07/737,048, 07/737,199, 07/788,804, 07/895,358 and 07/895,346 are incorporated herein by reference.

Figure 1:
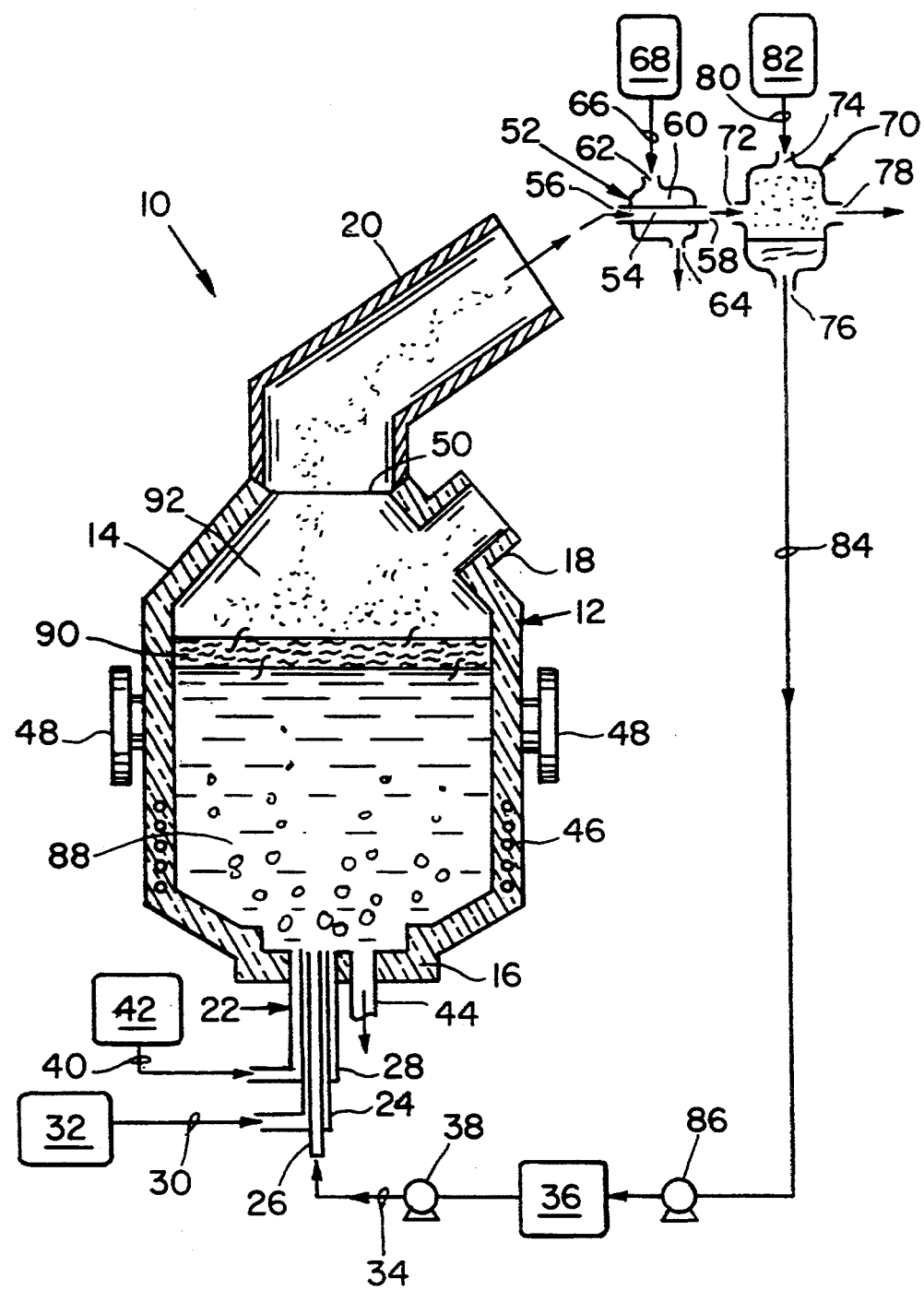
FIG. 1 is a schematic representation of one embodiment of the system of the invention.

System 10, illustrated in FIG. 1, is one embodiment of a system suitable for injecting a liquid into a molten bath according to the method of the invention. The system includes reactor 12. Examples of suitable reactors include K-BOP, Q-BOP, argon-oxygen decarbonization furnaces (AOD), EAF, etc., such as are known in the art of steelmaking. Reactor 12 includes upper portion 14 and lower portion 16. Feed inlet 18 at upper portion 14 of reactor 12 is suitable for directing feed into reactor 12. Off-gas outlet 20 extends from upper portion 14 and is suitable for conducting an off-gas out of reactor 12.

Tuyere 22 is disposed at lower portion 16 of reactor 12. Tuyere 22 includes gas conduit 24 and liquid conduit 26, which is disposed within gas conduit 24. Shroud gas conduit 28 is disposed about gas conduit 24. Conduit 30 extends from gas source 32 to gas conduit 24. Conduit 34 extends from liquid source 36 to liquid conduit 26 at reactor 12. Pump 38 is disposed at conduit 34 for directing liquid from liquid source 36 through conduit 34 and liquid conduit 26 into reactor 12. Conduit 40 extends from shroud gas source 42 to shroud gas conduit 28 of tuyere 22.

Bottom-tapping spout 44 extends from lower portion 16 and is suitable for removal of at least a portion of a molten bath from reactor 12. An additional bottom-tapping spout, not shown, can be provided as a means of continuously or intermittently removing at least a portion of a molten bath from reactor 12. Material in reactor 12 can also be removed by other means, such as are well known in the art of steelmaking. For example, material can be removed from reactor 12 by rotating reactor 12 and employing a launder, not shown, extending from feed inlet 18. Alternatively, the launder can extend into reactor 12 through a tap-hole, not shown.

Induction coil 46 is disposed at lower portion 16 for heating a molten bath within reactor 12 or for initiating generation of heat within reactor 12. It is to be understood that, alternatively, reactor 12 can be heated by other suitable means, such as by oxyfuel burners, electric arc, etc. Trunions 48 are disposed at reactor 12 for manipulation of reactor 12. Seal 50 is disposed between reactor 12 and off-gas outlet 20 and is suitable for allowing partial rotation of reactor 12 about trunions 48 without breaking seal 50.

Heat exchanger 52 is disposed at off-gas outlet 20. Heat exchanger 52 can be any suitable heat exchanger for cooling off-gas discharged from reactor 12. Examples of suitable heat exchangers include water-cooled hoods, shell-and-tube heat exchangers, etc. In one embodiment, heat exchanger 52 is a shell-and-tube heat exchanger which includes off-gas side 54 defining off-gas inlet 56 and off-gas outlet 58. Heat exchanger 52 also includes coolant side 60 which defines coolant inlet 62 and coolant outlet 64. Conduit 66 extends between coolant source 68 and coolant inlet 62 of heat exchanger 52. A coolant which is suitable for cooling off-gas is disposed at coolant source 68. Examples of suitable cooling media include, for example, water, ethylene glycol, ethylbenzene, alcohols, etc.

Scrubber 70 is disposed at off-gas outlet 58 of heat exchanger 52. Scrubber 70 is suitable for removing a component of the off-gas to form a stream which can be directed into reactor 12 or disposed of by some other suitable means. An example of a suitable scrubber is a caustic-type scrubber. Scrubber 70 defines off-gas inlet 72, scrubber fluid inlet 74, scrubber fluid outlet 76, and off-gas outlet 78. Conduit 80 extends between scrubber fluid source 82 and scrubber fluid inlet 74 of scrubber 70. A scrubber fluid which is suitable for separating at least one component of off-gas from the off-gas is disposed at scrubber fluid source 82. Examples of suitable scrubber fluids include sodium hydroxide (NaOH), calcium hydroxide ($Ca(OH)_2$), etc.

Conduit 84 extends from scrubber outlet 76 to liquid source 36. Pump 86 is disposed at conduit 84 for directing scrubber fluid from scrubber 70 to liquid source 36.

A reaction zone within system 10 includes molten bath 88, vitreous layer 90 and gaseous layer 92. In one embodiment, molten bath 88 is formed by at least partially filling reactor 12 with a suitable metal. The metal is then heated to form molten bath 88 by activating induction coil 46 or by some other suitable means, not shown. Where a molten bath having immiscible molten metal phases is to be formed, for example, two immiscible metals are introduced to reactor 12. The metals separate during melting to form a first molten metal phase and a second molten metal phase, which is substantially immiscible in the first molten metal phase.

Vitreous layer 90 is disposed on molten bath 88. Vitreous layer 90 is substantially immiscible with molten metal bath 88. Alternatively, system 10 does not include vitreous layer 90. Vitreous layer 90 includes at least one metal oxide. Typically, vitreous layer 90 is substantially fluid and free radicals and other gases can pass from molten bath 88 across vitreous layer 90. In one embodiment, vitreous layer 90 has a lower thermoconductivity than that of molten bath 88. Radiant loss of heat from molten bath 88 can thereby be reduced to below the radiant heat loss for molten bath 88 in the absence of a vitreous layer. It is to be understood that vitreous layer 90 can include more than one metal oxide. Vitreous layer 90 can also include more than one phase.

Vitreous layer 90 can be formed by directing suitable materials into reactor 12 and then heating the materials to a sufficient temperature to melt the materials. Vitreous layer 90 can also comprise slag or sludge contaminated with toxic metals or other valuable metals or their oxides that are suitable for reclamation. The materials can be directed onto the top of vitreous layer 90 or injected into molten bath 88, using methods such as are well known in the art of steelmaking.

Gaseous layer 92 extends from vitreous layer 90 at upper portion 14 of reactor 12 through off-gas outlet 20 to scrubber 70. Gaseous layer 92 includes off-gas formed in molten bath 88 and in vitreous layer 90. Off-gas is at least partially formed by volatilization and reaction of components of the liquid and gaseous feed to form gases, such as carbon monoxide and, optionally, carbon dioxide.

Simultaneously with direction of gas into molten bath 88, liquid is directed from liquid source 36 through conduit 34 and liquid conduit 26 into molten bath 88 by activation of pump 38. The liquid has a nucleation temperature which is lower than that of the temperature of molten bath 88, whereby the liquid will substantially volatilize or decompose upon exposure to the operating conditions of system 10 in molten bath 88.

Suitable operating conditions of system 10 include a temperature of molten bath 88 which is sufficient to volatilize or decompose a substantial portion of the liquid component of the liquid dispersion directed into molten bath 88. An example of a suitable temperature is a temperature above about 500°–600° C.

A suitable gas is directed from gas source 32 through conduit 30 and gas conduit 24 into molten bath 88. The gas is directed through gas conduit 24 into molten bath 88 by a suitable means. An example of suitable means by which the gas is directed through gas conduit 24 into molten bath 88 includes pressurization of gas source 32. A suitable shroud gas is directed from shroud gas source 42 through conduit 40 and shroud gas conduit 28 to cool tuyere 22 while gas and liquid are directed into molten bath 88 through gas and liquid conduits 24, 26, respectively. Examples of suitable shroud gases include methane, propane, natural gas, etc.

The velocity at which the gas is directed through gas conduit 24 into molten bath 88 is sufficient to cause liquid discharged from liquid conduit 26 to substantially atomize and thereby form a suitable liquid dispersion of the atomized liquid and the gas. The gas directed through gas conduit 24 can have a Froude number of greater than, for example, about 2400, to thereby prevent molten metal of molten bath 88 from entering gas tuyere 22 and thereby blocking introduction of gas into molten bath 88.

In one embodiment, the gas employed for forming the liquid dispersion is substantially inert under the conditions of the molten bath 88. Examples of such gases include argon, helium, etc. Alternatively, the gas can be reactive with a component of molten bath 88 or with a liquid directed into molten bath 88. Examples of reactive gases include oxygen, hydrogen, propane, methane, etc. For example, the liquid can be combustible under the operating conditions of system 10 in molten bath 88. The liquid can also be a liquid hazardous waste which substantially volatilizes or decomposes under the operating conditions of system 10 in molten bath 88. Specific examples of suitable liquid wastes include polychlorinated biphenyls, etc.

The liquid dispersion includes a liquid phase dispersed in a gas phase. The liquid phase of a suitable liquid dispersion has a ratio of surface area to volume of the liquid which is sufficient to cause an accumulated amount of the liquid phase in molten bath 88 to be less than that which would occur by injection of a continuous stream of the liquid into molten bath 88. The "accumulated amount of the liquid phase," as that term is defined herein, means the amount of liquid phase which is present in molten bath 88 under the operating conditions of system 10 at steady state conditions. In one embodiment, the accumulated amount of the liquid phase in molten bath 88 is sufficiently less than that which would occur by injection of substantially continuous stream of the liquid to cause the liquid to substantially volatilize or decompose without significant disruption of the integrity of molten bath 88, such as by an explosive volatilization or explosive combustion of the accumulated liquid. An example of a suitable ratio of surface area to volume of the liquid phase of the liquid dispersion is greater than about $6 \times 10^3$ (1/m).

The liquid dispersion is then injected into molten bath 88. The rate at which the liquid dispersion is directed into molten bath 88 is sufficient to cause liquid of the liquid phase to volatilize or decompose at a rate which is sufficient to cause the accumulation of the liquid phase in the bath to be significantly less than that which would occur by injection of a continuous stream of the liquid into molten bath 88.

Upon introduction of the liquid dispersion into molten bath 88, a substantial portion of the liquid volatilizes or decomposes. Optionally, molten bath 88 can be agitated to further particulate gas which is directed into molten metal bath 80. An example of a suitable method for agitating molten metal bath 80 is induction stirring or gas injection to induce stirring.

The volatilized liquid component or decomposition products of the liquid dispersion in molten bath 88 can react with components of the gas phase or with components of molten bath 88. Consequent reaction products can dissolve in molten bath 88 or be discharged as gaseous products from molten bath 88. Other components of off-gas formed in reactor 12 can include hydrogen gas, water, etc., formed by chemical transformation of other components of the liquid or gas phases directed into molten bath 88, such as organic compounds.

In one embodiment, off-gas formed in reactor 12 is conducted from reactor 12 through off-gas outlet 20 to heat exchanger 52. The off-gas is cooled in heat exchanger 52 by conducting the off-gas through off-gas side 54 of heat exchanger 52 and by directing a suitable cooling medium through coolant side 60 of heat exchanger 52. The Off-gas is conducted into heat exchanger 52 through off-gas inlet 56 and then through off-gas outlet 58. The coolant is directed from source 68 through coolant inlet 62 of heat exchanger 52 by a suitable means, such as by use of a pump, not shown. The coolant is directed through coolant side 60 of heat exchanger 52, thereby cooling the off-gas, and is then directed out of heat exchanger 52 through coolant outlet 64. The coolant is conducted through heat exchanger 52 at a rate sufficient to cool the off-gas to a temperature suitable for subsequent formation of a liquid composition from the cooled off-gas. In one embodiment, the off-gas is cooled to a temperature below about 500° C.

The off-gas is directed out of off-gas outlet 58 to scrubber 70 in order to expose the off-gas to conditions sufficient to remove at least one component from the off-gas for further processing, such as for return to reactor 12 or for treatment in an additional reactor, not shown. Examples of methods for treatment of the off-gas, including its separation and processing of components of the off gas, are disclosed in U.S. Patent Application Ser. No. 07/737,048, the teachings of which are included herein by reference.

In those cases where the off-gases contain volatilizable, readily reducible metal, such as zinc, mercury and cadmium, the gases can be directed to a condenser and recovered by condensation. The gaseous metal vapors can be condensed and the liquid metal and alloys can be tapped in a suitable manner, such as by scrubbing. Optionally, material that accumulates at the condenser can be recycled to the reaction zone. Nonvolatile metals can be tapped as an alloy. Also, carbon monoxide can be a recoverable product of the method. A liquid stream formed by scrubbing the off-gas can be directed through conduit 84 to liquid source 36.

Figure 2:
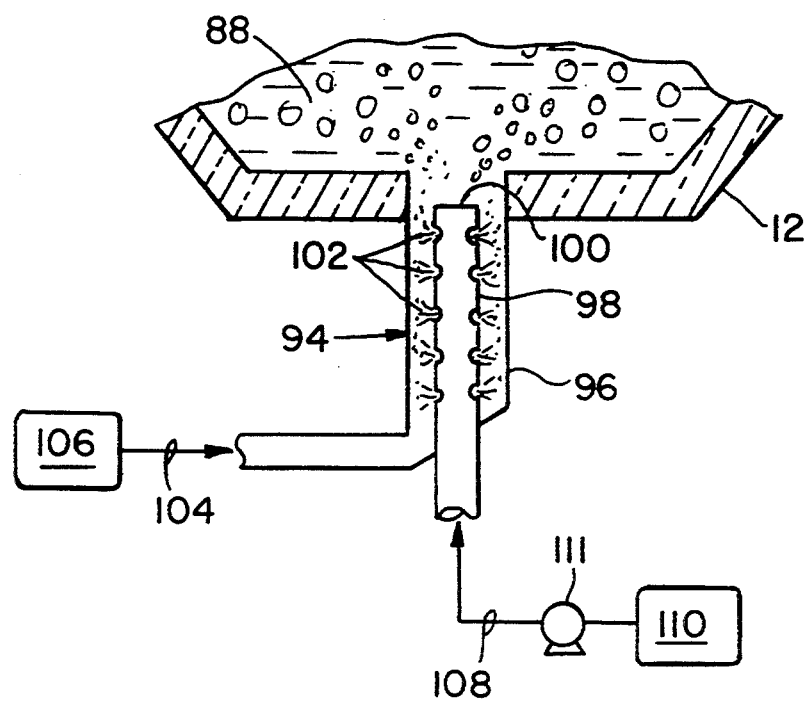
FIG. 2 is a partial section view of a tuyere of the invention.

In another embodiment, shown in FIG. 2, the system of the invention includes tuyere 94 at reactor 12. Tuyere 94 includes outer tube 96 and inner tube 98, which is concentrically disposed within outer tube 96. Inner tube 98 is sealed at end 100 and defines a plurality of perforations 102. End 100 is recessed within outer tube 96. The distance of end 100 of inner tube 98 from molten bath 88 is sufficient to prevent damage to inner tube 98 by molten bath 88 as the wall of reactor 12 wears down during operation of the system 10. Inner tube 98 can be retractable along a major axis of outer tube 96 to thereby prevent contact between molten bath 88 and inner tube 98 as the wall of reactor 12 wears down during operation of system 10.

Tuyere 94 is disposed at reactor 11 at a point below an upper surface of molten bath 88 within reactor 12. Conduit 104 extends from gas source 106 to outer tube 96 of tuyere 94. Conduit 108 extends from liquid source 110 to inner tube 98.

Liquid is directed from liquid source 110 through inner tube 98 by pump 111 at conduit 108 and passes through perforations 102. Gas is directed from gas source 106 through conduit 104 and outer tube 96 into molten bath 88. The velocity at which gas is directed through outer tube 96 of tuyere 94 is sufficient to substantially atomize liquid discharged from inner tube 98 through perforations 102. The atomized liquid and the gas form a suitable liquid dispersion of atomized liquid in the gas. The ratio of surface area to volume of the liquid phase of the liquid dispersion formed by tuyere 94 is sufficient to cause an accumulated amount of the liquid phase in molten bath 88 to be less than that which would occur by injection of a substantially continuous stream of the liquid in molten bath 88.

The liquid dispersion is directed from tuyere 94 into molten bath 88. The atomized liquid of the liquid dispersion in molten bath 88 substantially volatilizes or decomposes in molten bath 88. The volatilized liquid component or decomposition products are then available for reaction, under the operating conditions of system 10, with components of the gas phase or with components of molten bath 88.

Figure 3:
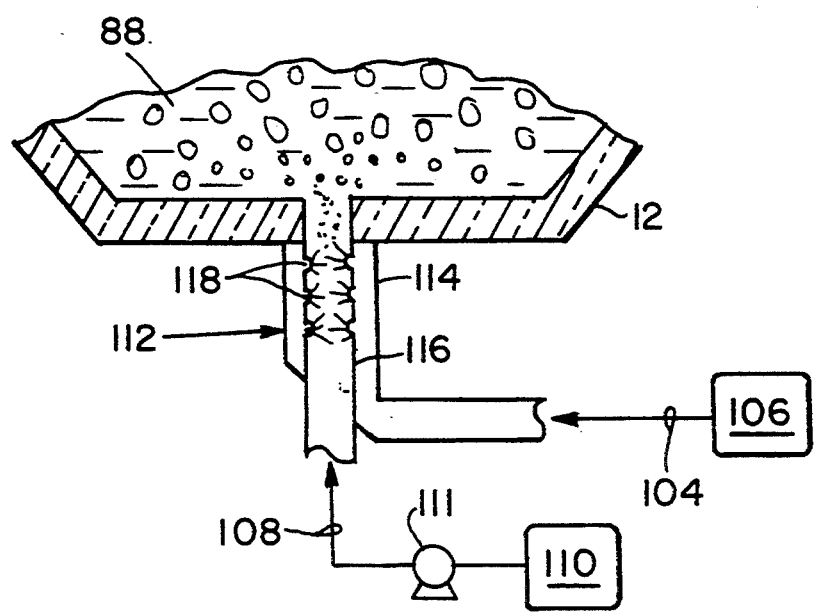
FIG. 3 is a section view of an alternative embodiment of a tuyere of the invention.

In an alternate embodiment, shown in. FIG. 3, tuyere 112 includes outer tube 114 which abuts reactor 12. Inner tube 116 passes through reactor 12 and defines a plurality of perforations 118 which provide fluid communication between reactor 12 and outer tube 114. Liquid is directed by pump 111 from liquid source 110 through liquid conduit 108 and into outer tube 114 of tuyere 112. A liquid then passes through perforations 118 of inner tube 116. Gas is simultaneously directed by suitable means from gas source 106 through gas conduit 104 and inner tube 116. The velocity at which gas is directed through inner tube 116 is sufficient to substantially atomize liquid passing through perforations 118 of inner tube 116. Atomization of the liquid directed into inner tube 116 causes a suitable liquid dispersion to form of the liquid and the gas. The liquid dispersion is directed into molten bath 88. The liquid particles in the liquid dispersion volatilize or decompose under the operating conditions of system 10 in molten bath 88.

Figure 4:
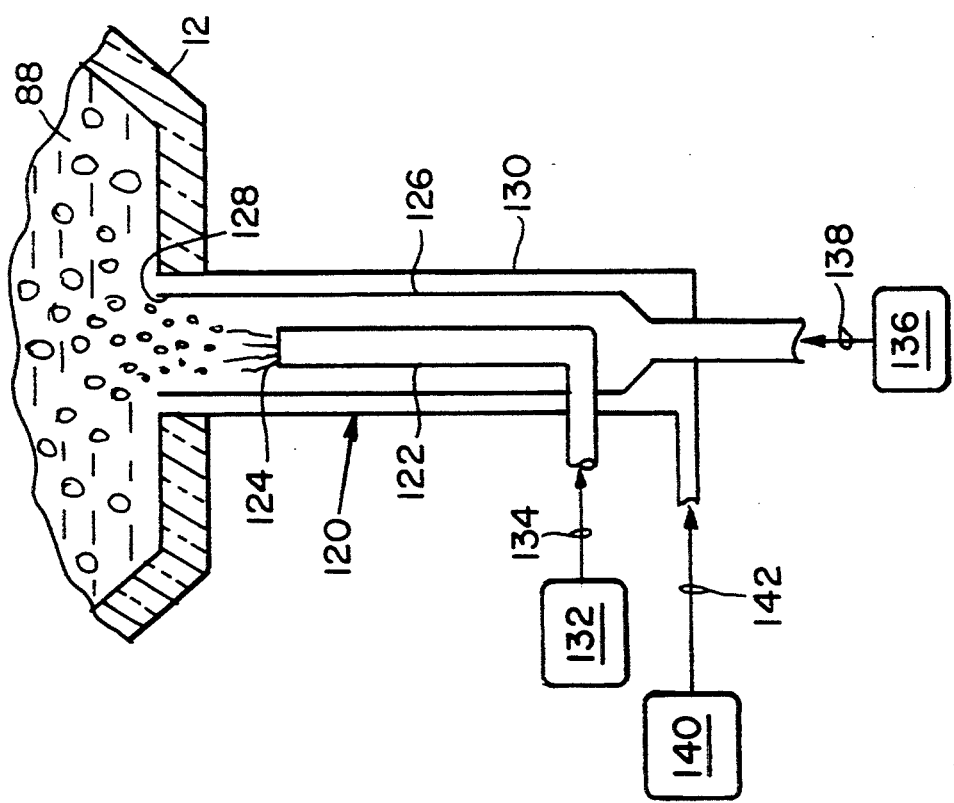
FIG. 4 is a section view of another embodiment of a tuyere of the invention.

In still another embodiment, shown in FIG. 4, tuyere 120 includes liquid conduit 122, having liquid-discharge end 124. Liquid conduit 122 is disposed within gas conduit 126. Gas conduit 126, in turn, includes gas-discharge end 128. Liquid-discharge end 124 of liquid conduit 122 is recessed within gas conduit 126 at a distance from gas-discharge end 124 which is sufficient to enable an atomizing gas, which is directed through gas conduit 126, to atomize liquid discharged from liquid conduit 122 before the liquid contacts molten bath 88 into which the gas and the liquid are discharged. Gas-discharge end 128 of gas conduit 126 is disposed at reactor 12 at a point below the surface of molten bath 88 disposed within reactor 12. Examples of suitable atomizing gases for direction through gas conduit 126 to atomize liquid discharged from liquid conduit 122 include steam, propane, nitrogen gas, etc. Coolant tube 130 is disposed about gas conduit 126.

A suitable liquid is directed from liquid source 132 through conduit 134 and through liquid conduit 122, and is discharged from liquid conduit 122 at liquid-discharge end 124. An atomizing gas is directed from gas source 136 through conduit 138 and gas conduit 126 simultaneously and conjointly with discharge of liquid from liquid-discharge end 124 of liquid Conduit 122. The rate at which the atomizing gas is directed through gas conduit 126 is sufficient to cause the velocity of the atomizing gas through gas conduit 126 at liquid discharge end 124 of liquid conduit 122 to be sufficient, relative to the rate of liquid discharge from liquid-discharge end 124, to cause the liquid discharged from liquid-discharge end 124 to substantially atomize within gas conduit 126 prior to introduction of the liquid into molten bath 88 within reactor 12 and to form a suitable liquid dispersion. Further, the rate at which gas is directed through gas conduit 126 is sufficient to prevent intrusion of molten bath 88 into tuyere 120. Further, coolant is simultaneously and conjointly directed from coolant source 140 through conduit 142 and coolant tube 130 of tuyere 120 at a rate which is sufficient to cool molten bath 88 in a portion of molten bath 88 which is proximate to gas-discharge end 128 of tuyere 120. Examples of suitable coolants include propane, methane, etc.

Figure 5:
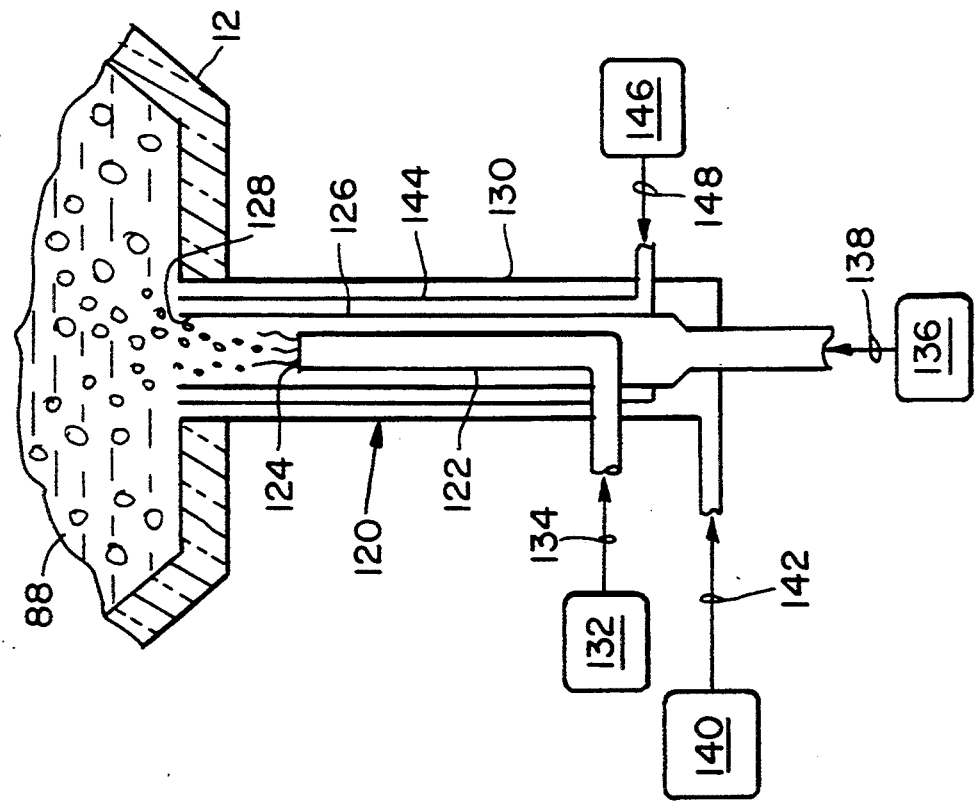
FIG. 5 is a section view of another embodiment of the tuyere shown in FIG. 4, further including an oxidant tube.

Optionally, as shown in FIG. 5, tuyere further includes oxidant tube 144 disposed within coolant tube 130 but also disposed about gas conduit 126. Oxidant is directed from oxidant source 146 through conduit 148 and oxidant tube 144 for combination with the liquid dispersion of the atomized liquid and gas formed within gas conduit 126. The oxidant and liquid dispersion combine within molten bath 88 to cause, for example, combustion of the liquid component of the liquid dispersion following volatilization of the atomized liquid within molten bath 88. Examples of suitable oxidants include, for example, oxygen gas, air, chlorine gas, iron oxide, etc.

Figure 6:
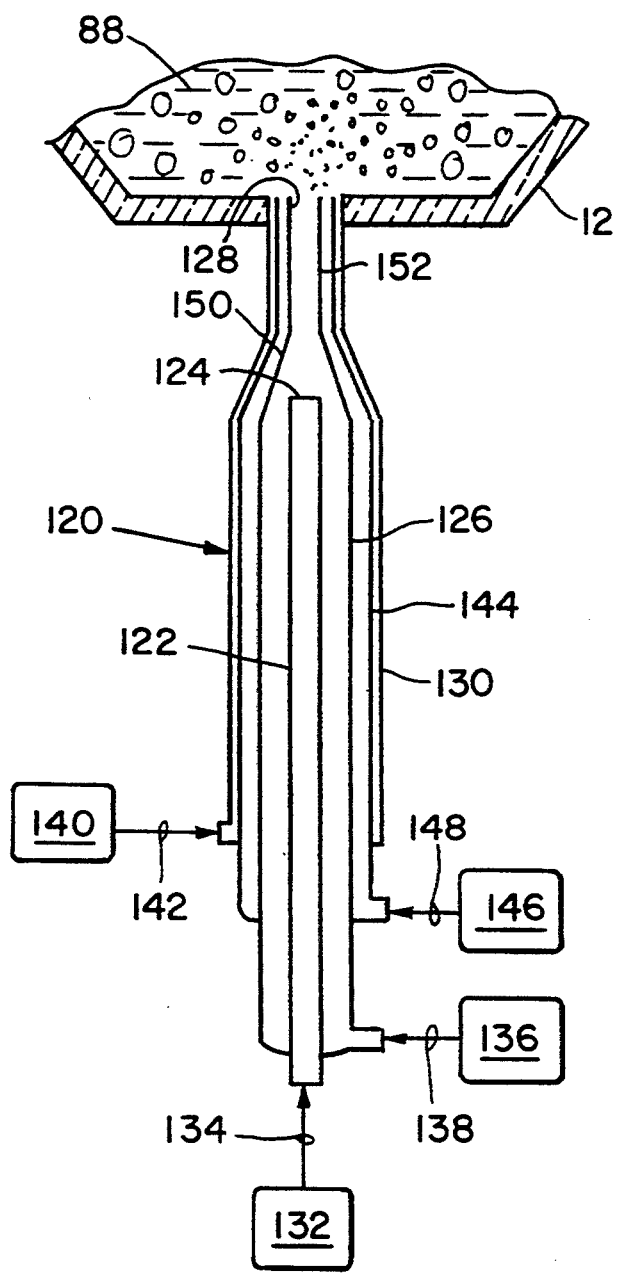
FIG. 6 is a section view of another embodiment of the tuyere shown in FIG. 5, further including a tapered portion of a gas conduit of the tuyere.

FIG. 6 is another optional embodiment of tuyere 120, wherein gas conduit 126 includes tapered portion 150 which is proximate to liquid-discharge end 124 of liquid conduit 122. Gas conduit 126 further includes an atomizing portion 152 which extends between tapered portion 150 and gas-discharge end 128. In one embodiment, atomizing portion 152 has a substantially constant diameter. Also, oxidant tube 144 and coolant tube 130 are also tapered about tapered portion 150 of gas conduit 126. Atomizing gas which is directed through gas conduit 126 accelerates at tapered portion 150 of gas conduit 126, thereby facilitating atomization of liquid discharged from liquid-discharge end 124 of liquid conduit 122. The liquid substantially atomizes in atomizing portion 152 of gas conduit 126 to form a suitable liquid dispersion.

Figure 7:
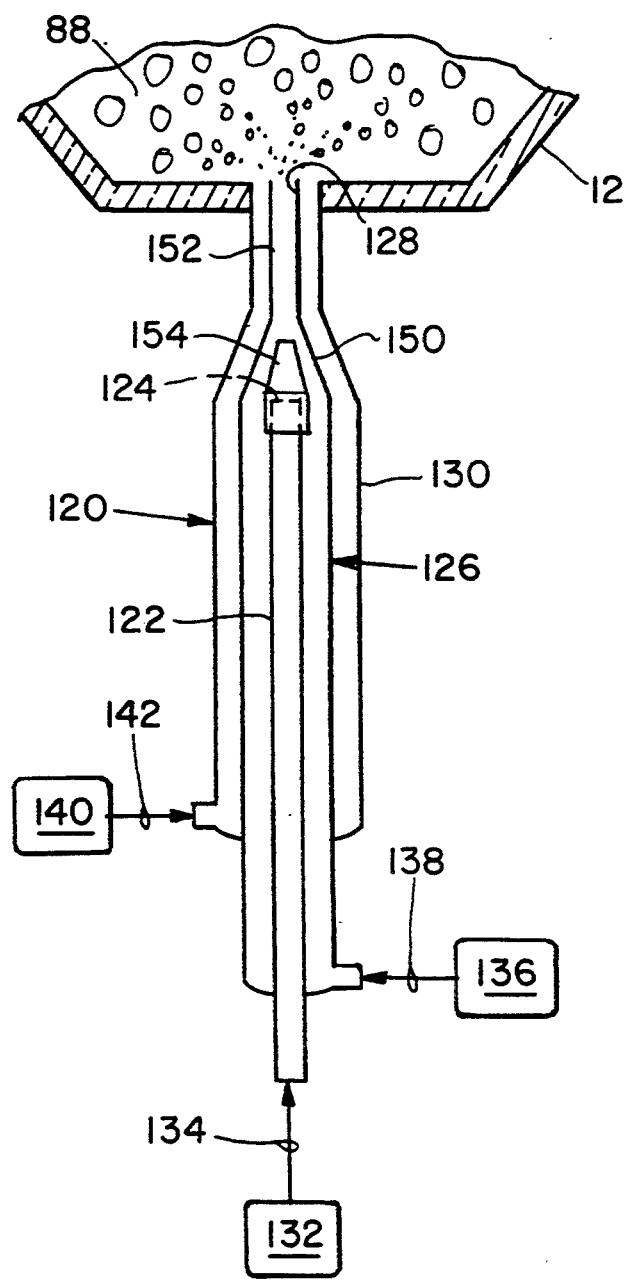
FIG. 7 is a section view of the tuyere shown in FIG. 6, further including a nozzle, but without an oxidant tube.

In still another optional embodiment, shown in FIG. 7, nozzle 154 is disposed at liquid-discharge end 124 of liquid conduit 122 and within gas conduit 126. An example of a suitable nozzle is a spinner-type nozzle. Nozzle 154 channels atomizing gas directed through gas conduit 126 into the path of liquid discharged from liquid conduit 122, thereby further facilitating atomization of the liquid prior to introduction of a resultant suitable liquid dispersion into molten bath 88.

Equivalents

Those skilled in the art will recognize, or be able to ascertain using no more than routine experimentation, many equivalents of the invention describes specifically herein. Such equivalents are intended to be encompassed in the scope of the following claims.

We claim:

1. A method for injecting a liquid into a molten metal bath, comprising the steps of:
   a) atomizing a liquid in the presence of a gas to form a liquid dispersion having a liquid phase dispersed in a gas phase, and wherein the liquid phase has a ratio of surface area to volume which is sufficient to cause an accumulated amount of the liquid phase in the molten metal bath to be less than that which would occur by injection of a continuous stream of the liquid into the molten metal bath at an equal feed rate; and thereafter
   b) directing the liquid dispersion into a molten metal bath, having a temperature which is significantly greater than the nucleation temperature of the liquid phase at the operating conditions of the molten metal bath, at a rate which is sufficient to cause liquid of the liquid phase to volatilize or decompose at a rate which is sufficient to cause the accumulation of the liquid phase in the bath to be less than that which would occur by injection of a continuous stream of the liquid into the molten metal bath at an equal feed rate.

2. The method of claim 1 wherein the liquid dispersion is directed into the molten metal bath at a plurality of points beneath an upper surface of the molten metal bath.

3. The method of claim 2 wherein the gas component of the liquid dispersion is inert under the operating conditions of the molten metal bath.

4. The method of claim 2 wherein a portion of the gas component of the liquid dispersion reacts with a component of the molten metal bath under the operating conditions of the molten metal bath.

5. The method of claim 4 wherein the liquid of the liquid dispersion is reactive under the operating conditions of the molten metal bath.

6. A method for injecting a liquid into a molten metal bath, comprising the steps of:
   a) directing a liquid through a liquid conduit which is disposed within a gas conduit that is in fluid communication with a molten metal bath, the liquid having a nucleation temperature which is significantly lower than that of the molten metal bath, and wherein the liquid conduit has a liquid-discharge end which is recessed within the gas conduit at a distance from a gas-discharge end of the gas conduit at the molten bath which is sufficient to allow a gas which is directed through the gas conduit to substantially atomize the liquid and form a liquid dispersion prior to introduction of the liquid into the molten metal bath; and thereafter
   b) directing a gas through the gas conduit at a velocity, relative to the velocity of liquid discharge from the liquid-discharge end of the liquid conduit to cause the discharged liquid to atomize and form a liquid dispersion prior to introduction of the liquid into the molten metal bath, the liquid dispersion having a liquid phase dispersed in a gas phase.

7. A tuyere for atomizing a volatilizable liquid during submerged injection into a molten metal bath, comprising:
   a) a liquid conduit, having a liquid-discharge end; and
   b) a gas conduit, within which the liquid conduit is disposed, and having a gas-discharge end, wherein the liquid discharge end is recessed within the gas conduit at a distance from the gas discharge end which is sufficient to enable an atomizing gas, which is directed through the gas conduit, to atomize liquid discharged from the liquid conduit and form a liquid dispersion before the liquid contacts a molten metal bath into which the gas and the liquid are injected, the liquid dispersion having a liquid phase dispersed in a gas phase; and
   c) an oxidant tube, within which the gas conduit is disposed, whereby the liquid dispersion can combine with an oxidant gas discharged from the oxidant tube during injection of the liquid dispersion into the molten metal bath.

8. The tuyere of claim 7, wherein the gas conduit further includes a tapered portion proximate to the liquid-discharge end.

9. The tuyere of claim 8 wherein the liquid discharge end of the liquid conduit is disposed within the tapered portion.

10. The tuyere of claim 9 wherein the gas conduit further includes an atomizing portion having substantially constant diameter, which extends between the tapered portion and the gas-discharge end.

11. The tuyere of claim 10, further including a nozzle disposed within the gas conduit and at the liquid-discharge end of the liquid conduit.

12. The tuyere of claim 11, wherein the oxidant tube includes a tapered portion which is disposed about the tapered portion of the gas conduit.

13. The tuyere of claim 12 further including a coolant tube which is disposed about the oxidant tube.

* * * * *